United States Patent
Dong et al.

(10) Patent No.: US 10,152,214 B2
(45) Date of Patent: Dec. 11, 2018

(54) METHOD AND MOBILE TERMINAL FOR DISPLAYING VISUAL PROMPT

(71) Applicant: Hisense Mobile Communications Technology Co., Ltd., Qingdao, Shandong (CN)

(72) Inventors: Tiantian Dong, Shandong (CN); Wenjuan Du, Shandong (CN)

(73) Assignee: Hisense Mobile Communications Technology Co., Ltd., Qingdao (CN)

( * ) Notice: Subject to any disclaimer, the term of this patent is extended or adjusted under 35 U.S.C. 154(b) by 406 days.

(21) Appl. No.: 14/976,869

(22) Filed: Dec. 21, 2015

(65) Prior Publication Data
US 2016/0239193 A1    Aug. 18, 2016

(30) Foreign Application Priority Data
Feb. 13, 2015  (CN) .......................... 2015 1 0080833

(51) Int. Cl.
*G06F 3/0484*    (2013.01)
*G06T 13/80*    (2011.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
CPC .............. G06F 3/04847; G06F 3/0482; G06F 3/04842; G06F 11/302; G06F 11/3438; G06T 13/80
(Continued)

(56) References Cited

U.S. PATENT DOCUMENTS 6,407,749 B1 *  6/2002  Duke .................... G06F 3/0481
                                                    345/660
6,597,857 B1 *  7/2003  Clapper .............. G11B 19/025
                                                    348/E5.102
(Continued)

FOREIGN PATENT DOCUMENTS

CN    102200942    9/2011
CN    102681824    9/2012
(Continued)

OTHER PUBLICATIONS

Second Office Action dated May 3, 2017 for China Patent Application No. 201510080833.8 with English Translation and Supplemental Search (19 pp.).
(Continued)

*Primary Examiner* — David Phantana-angkool
(74) *Attorney, Agent, or Firm* — Brinks Gilson & Lione

(57) ABSTRACT

The present disclosure provides a method and a mobile terminal for displaying a visual prompt. The method, implemented in the mobile terminal, includes: monitoring an application; determining after detecting that running of the application has met an interruption trigger condition, and according to a current display probability X, whether a first virtual animation image including option information on the application interruption needs to be displayed; and displaying, after it is determined that the first virtual animation image needs to be displayed, the first virtual animation image. As a mobile terminal has an additional function of performing real-time monitoring on running the application, and can prompt, after detecting that a preset trigger condition has been met according to monitoring conditions, a user by using a virtual animation image to interrupt the running the application, thereby increasing functions of a mobile terminal.

20 Claims, 4 Drawing Sheets

(51) Int. Cl.
*G06F 3/0482* (2013.01)
*G06F 11/34* (2006.01)
*G06F 11/30* (2006.01)

(52) U.S. Cl.
CPC ........ *G06F 11/302* (2013.01); *G06F 11/3438* (2013.01); *G06T 13/80* (2013.01)

(58) Field of Classification Search
USPC .......................................................... 715/772
See application file for complete search history.

(56) References Cited

U.S. PATENT DOCUMENTS

| | | | | |
|---|---|---|---|---|
| 8,099,738 | B2 * | 1/2012 | Akiyama | G06F 9/451 |
| | | | | 719/318 |
| 9,532,167 | B2 * | 12/2016 | Sugaya | H04W 4/02 |
| 9,639,531 | B2 * | 5/2017 | Deliyannis | G06F 17/3002 |
| 9,740,381 | B1 * | 8/2017 | Chaudhri | G06F 3/04845 |
| 9,829,873 | B2 * | 11/2017 | Alfredsson | G05B 19/0425 |
| 2014/0155022 | A1 * | 6/2014 | Kandregula | G06Q 50/01 |
| | | | | 455/405 |
| 2016/0239193 | A1 * | 8/2016 | Dong | G06F 3/04847 |
| 2018/0181294 | A1 * | 6/2018 | Dare | G06F 3/04883 |

FOREIGN PATENT DOCUMENTS

| | | |
|---|---|---|
| CN | 102681824 A1 | 9/2012 |
| CN | 103442127 | 12/2013 |
| CN | 103793052 | 5/2014 |
| CN | 103793052 A | 5/2014 |

OTHER PUBLICATIONS

JavaScript Self-Teaching Course, undated (4 pp.).
First Chinese Office Action to Chinese Application No. 201510080833.8 dated Jan. 16, 2017 along with English Translation, (15p).

* cited by examiner

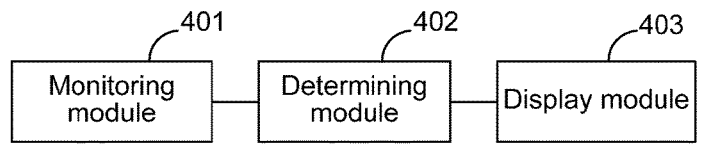
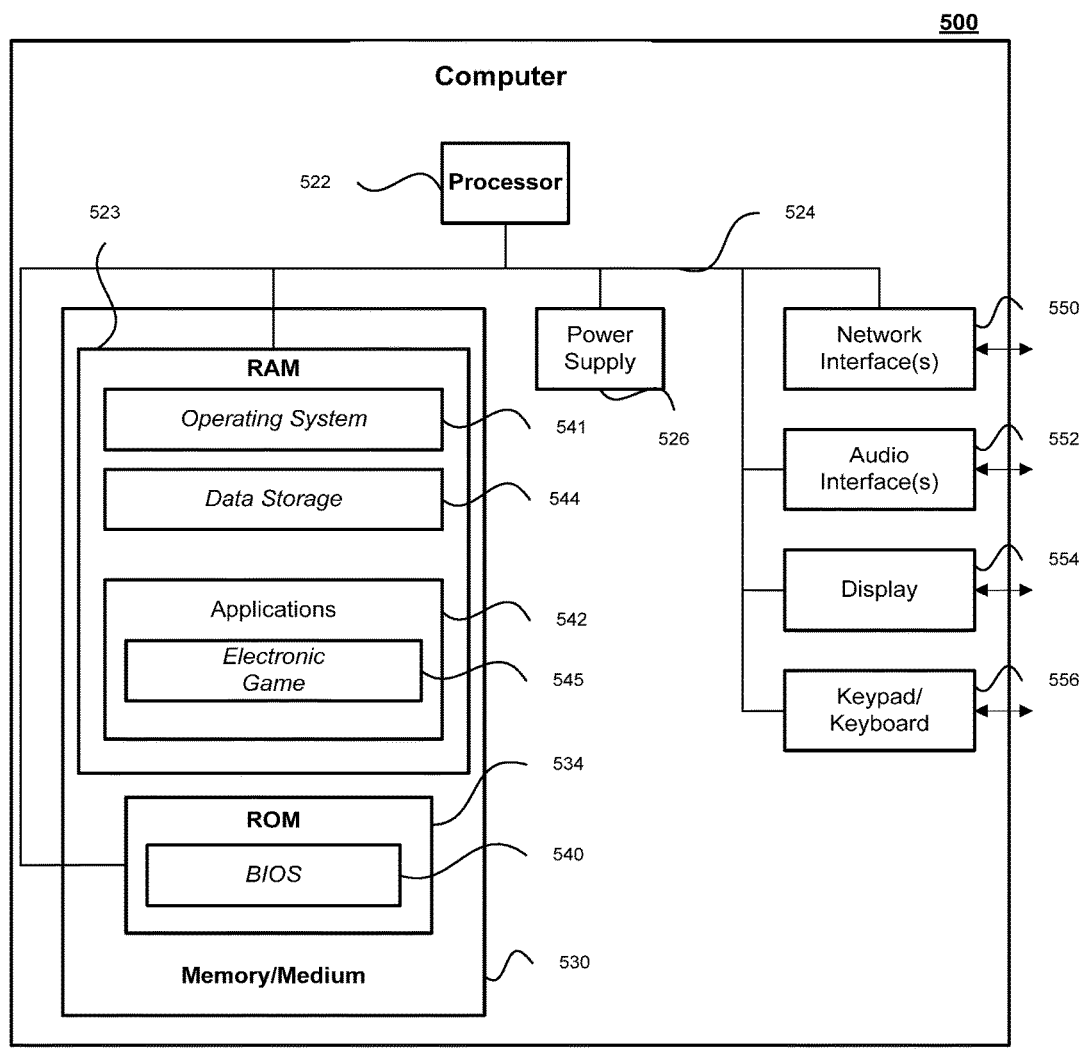

METHOD AND MOBILE TERMINAL FOR DISPLAYING VISUAL PROMPT

PRIORITY STATEMENT

This application claims the priority benefit of Chinese Patent Application No. 201510080833.8 filed on Feb. 13, 2015, the disclosure of which is incorporated herein in its entirety by reference.

BACKGROUND

The present disclosure relates to the technical field of intelligent devices, and in particular, to a method and a mobile terminal for displaying a visual prompt.

RELATED ART

With rapid development of wireless communications technologies, various mobile terminals such as a mobile phone and a tablet computer have stronger functions and greater recreational features, so that many users have used a mobile terminal as an entertainment tool. However, generally when a mobile terminal is running, the mobile terminal can only perform monitoring and give a prompt on status information thereof such as battery capacity and traffic information, and has a comparatively single function.

In conclusion, an existing mobile terminal can only perform monitoring and give a prompt on status information thereof, and has a comparatively single function.

SUMMARY

The present disclosure provides a method and a mobile terminal for displaying a visual prompt, so as to solve a problem that an existing mobile terminal can only perform monitoring and give a prompt on status information thereof, and has a comparatively single function.

An exemplary embodiment of the present disclosure provides a method for displaying a visual prompt, including:

performing, by a mobile terminal, after detecting that the application with a monitoring identifier has been started, monitoring on the application;

determining, by the mobile terminal, after detecting that running of the application has met an interruption trigger condition, and according to a current display probability X, whether a first virtual animation image including option information on the application interruption needs to be displayed; and displaying, after it is determined that the first virtual animation image needs to be displayed, the first virtual animation image.

In this exemplary embodiment of the present disclosure, as a mobile terminal not only has an additional function of performing, when the application that needs to be monitored is run, real-time monitoring on the running the application, but also can prompt, when it is detected according to monitoring conditions that a preset trigger condition has been met, a user by using a virtual animation image to interrupt the running the application, thereby increasing functions of a mobile terminal.

An exemplary embodiment of the present disclosure provides a mobile terminal for displaying a visual prompt, the mobile terminal including:

a monitoring module, configured to perform, after it is detected that the application with a monitoring identifier has been started, monitoring on the application;

a determining module, configured to determine, after it is detected that running of the application has met an interruption trigger condition, and according to a current display probability X, whether a first virtual animation image including option information on the application interruption needs to be displayed; and a display module, configured to display, after it is determined that the first virtual animation image needs to be displayed, the first virtual animation image.

BRIEF DESCRIPTION OF THE DRAWINGS

FIG. 4 is a schematic structural diagram of a mobile terminal for displaying a visual prompt according to an exemplary embodiment of the present disclosure; and FIG. 5 is a schematic diagram illustrating an exemplary embodiment of an electronic device.

DETAILED DESCRIPTION

Figure 1:
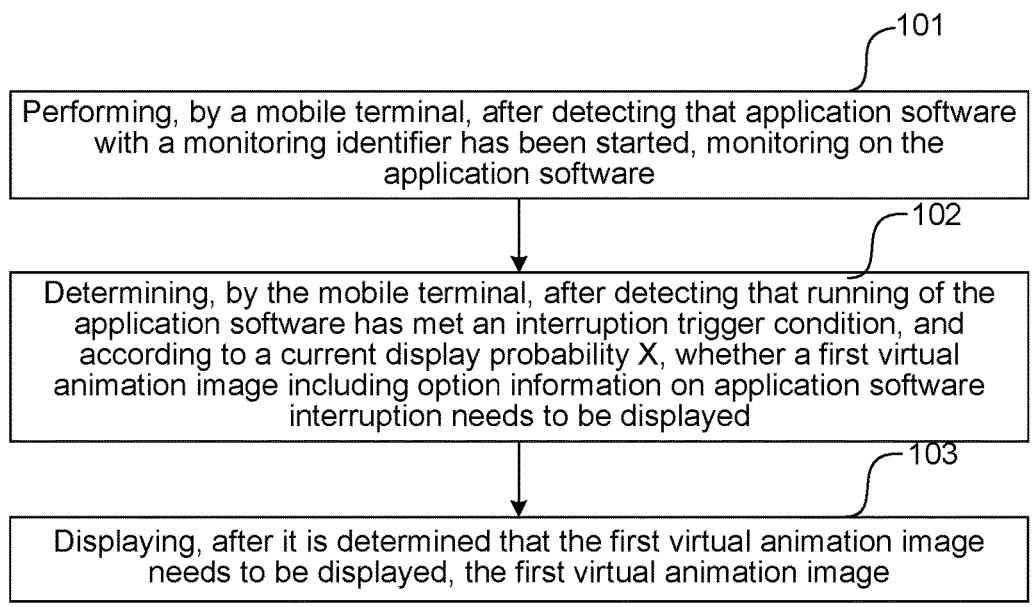
FIG. 1 is a schematic flowchart of a method for displaying a visual prompt according to an exemplary embodiment of the present disclosure.

In the exemplary embodiments of the present disclosure, a mobile terminal performs, after detecting the application with a monitoring identifier has been started, monitoring on the application. The mobile terminal determines, after detecting that running of the application has met an interruption trigger condition, and according to a current display probability X, whether a first virtual animation image including option information on the application interruption needs to be displayed; and displays, after it is determined that the first virtual animation image needs to be displayed, the first virtual animation image. In the exemplary embodiments of the present disclosure, as a mobile terminal not only has an additional function of performing, when the application that needs to be monitored is run, real-time monitoring on the running the application, but also can prompt, when it is detected according to monitoring conditions that a preset trigger condition has been met, a user by using a virtual animation image with a certain probability X to interrupt the running the application, thereby increasing functions of a mobile terminal.

FIG. 5 is a schematic diagram illustrating an exemplary embodiment of an electronic device for implementing methods introduced in the present disclosure. The electronic device 500 may be a computing device capable of executing a software system. The electronic device 500 may, for example, be a device such as a personal desktop computer or a portable device, such as a laptop computer, a tablet computer, a cellular telephone, or a smart phone.

The electronic device 500 may vary in terms of capabilities or features. Claimed subject matter is intended to cover a wide range of potential variations. For example, the electronic device 500 may include am image processing hardware, such as a camera and/or a webcam. It may also include a keypad/keyboard 556 and a display 554, such as a liquid crystal display (LCD), or a display with a high degree of functionality, such as a touch-sensitive color 2D or 3D display. In contrast, however, as another example, a webenabled electronic device 500 may include one or more physical or virtual keyboards, and mass storage medium 530.

The electronic device 500 may also include or may execute a variety of operating systems 541. The electronic device 500 may include or may execute a variety of possible applications 542, such as a photo processing application 545. An application 542 may enable communication with other devices via a network, such as communicating with another computer or electronic device 500 via a network.

Further, the electronic device 500 may include one or more non-transitory processor-readable storage media 530 and one or more processors 522 in communication with the non-transitory processor-readable storage media 530. For example, the non-transitory processor-readable storage media 530 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 530 may store sets of instructions, or units and/or modules that include the sets of instructions, for conducting operations and/or method steps described in the present disclosure. Alternatively, the units and/or modules may be hardware disposed in the electronic device 500 configured to conduct operations and/or method steps described in the present disclosure. The one or more processors may be configured to execute the sets of instructions and perform the methods and/or operations in exemplary embodiments of the present disclosure.

Merely for illustration, only one processor will be described in electronic devices that execute operations and/or method steps in the following exemplary embodiments. However, it should be note that the electronic devices in the present disclosure may also include multiple processors, thus operations and/or method steps that are performed by one processor as described in the present disclosure may also be jointly or separately performed by the multiple processors. For example, if in the present disclosure a processor of an electronic device executes both step A and step B, it should be understood that step A and step B may also be performed by two different processors jointly or separately in the electronic device (e.g., the first processor executes step A and the second processor executes step B, or the first and second processors jointly execute steps A and B).

FIG. 1 is a flowchart illustrating a method for displaying a visual prompt. The method may be implemented as a set of instructions and stored in the storage medium 530 of the electronic device 500, which may be a mobile terminal. The processor 522 may execute the set of instructions to perform operations of the method. The operations may include:

Step 101: monitoring an application with a monitoring identifier by a mobile terminal when detecting that the application has been started and/or called by the mobile terminal.

Step 102: Determining, by the mobile terminal, after detecting that running of the application has met an interruption trigger condition, and according to a current display probability X, whether a first virtual animation image including option information on the application interruption needs to be displayed.

Step 103: Displaying the first virtual animation image after determining that the first virtual animation image needs to be displayed.

In this exemplary embodiment of the present disclosure, a mobile terminal can perform monitoring on all applications in the mobile terminal, including system software and custom installed software of a user, and can also set, as demanded, the application that needs to be monitored. After some the application gets started, the mobile terminal may inspect the application that has been started. If the application that has been started is detected to include a monitoring identifier, it indicates that the mobile terminal needs to perform monitoring on the application. And then, after the running the application is detected to have met an interruption trigger condition, and according to a certain display probability X, it is determined whether the mobile terminal needs to display a first virtual animation image.

By adopting the method according to this exemplary embodiment of the present disclosure, a probability X may be set to give a resistant prompt for a continuous behavior of a user, prompting the user to interrupt and take a rest, so as to prevent from excessive use or enthrallment. In this design, a full-screen virtual image is used to present a specific expression and motion as a prompt, thereby improving visuality and prompting performance. Meanwhile, as a mobile terminal has a reverse feedback mechanism that does not completely conform to a user's expectation, a resistant prompt makes a user feel that the mobile phone itself has a certain emotional factor and subjective initiative, which is more vivid and lively compared to a conventional mobile terminal that receives a command to give feedback, thereby improving user viscosity.

During implementation, a first virtual animation image used for prompting a user to interrupt the application is one of a first group of preset virtual image motions. For example, a group of animation expressions (including a plurality of different animation expressions such as a calm expression, a melancholy expression, an unpleasant expression, a sad expression and a worried expression) may be set in advance, in which one type of animation expression may be displayed each time randomly or according to a set rule.

The trigger condition includes two circumstances, namely, the number N of times of omitting software interruption is greater than a preset threshold, and an abnormal event occurs, which are specifically described as follows:

A first circumstance: the number N of times of omitting software interruption within a preset duration is greater than a preset threshold.

After step 101 is performed, and before step 102 is performed, a process of determining a trigger condition is further included, which is specifically described as follows.

In an example, after the performing, by a mobile terminal, monitoring on the application, and before the detecting that a trigger condition for prompting to interrupt the application has been met, the method further includes:

Displaying, by the mobile terminal, if running duration of the application exceeds average duration of daily running of the application, a second virtual animation image including option information on the application interruption.

During implementation, a mobile terminal can perform real-time monitoring on running duration of the application, and recording daily running duration of each piece of software, so as to calculate average daily running duration of each piece of software in the mobile terminal. If it is detected that running duration of the application exceeds average duration of daily running of the application, the mobile terminal displays a second virtual animation image including option information on the application interruption.

The second virtual animation image used for prompting a user to interrupt the application is one of a second group of preset virtual image motions. For example, a group of animation expressions (including a plurality of different animation expressions such as smiling, being naughty, being happy, and narrowing eyes) may be set in advance, in which one type of animation expression may be displayed each time randomly or according to a set rule. Meanwhile, the second virtual animation image not only includes option information on the application interruption, but also may be configured to prompt information on running duration of the application.

The mobile terminal may continue, after displaying the second virtual animation image, determining whether the application has been interrupted, which is specifically described as follows.

In an example, the mobile terminal determines whether the application has been interrupted; adds, after it is determined that the application has not been interrupted, a step-size value to the number N of times of omitting software interruption; and determines whether the number N of times of omitting software interruption within a first preset duration is greater than a preset threshold.

The determining whether the application has been interrupted, includes:

Determining, if a user does not click an interruption key displayed by the mobile terminal within a second preset duration, or a user clicks an omission key displayed by the mobile terminal, that the application has not been interrupted.

During implementation, the number N of times of omitting software interruption is introduced, and used for recording the number of times of omitting a prompt of the application interruption by a user. If a mobile terminal has not detected within a period of time that a user clicks an interruption key (that is, a user does not click an interruption key displayed by the mobile terminal), or a user directly clicks an omission key in the option information on interruption (that is, a user clicks an omission key displayed by the mobile terminal), it can be determined that the application has not been interrupted. Then, the mobile terminal adds a step-size value to the number N of times of omitting software interruption, and determines whether the number N of times of omitting software interruption within a preset time (namely, a first preset duration) is greater than a preset threshold.

For example, a value of N may be set as demanded. Each time software interruption is omitted, or if an application interruption key has not been clicked for a long time, the value of N is increased by 1. The mobile terminal then continues determining whether the value of N exceeds 7 within a week.

In an example, the detecting, by the mobile terminal, that a trigger condition for prompting to interrupt the application has been met, includes:

Determining, if the number N of times of omitting software interruption within a first preset duration is greater than a preset threshold, that a trigger condition for prompting to interrupt the application has been met as detected.

During implementation, if the number N of times of omitting software interruption within a period of time (namely, a first preset duration) is greater than a preset threshold, it is determined that a trigger condition for prompting to interrupt the application has been met as detected, and then perform step 102.

For example, if a mobile terminal determines that the value of N has exceeded 7 within a week, the mobile terminal may determine, according to a current display probability X, whether a first virtual animation image including option information on the application interruption needs to be displayed.

In an example, after the determining, by the mobile terminal, whether the number N of times of omitting software interruption within a first preset duration is greater than a preset threshold, the method further includes:

Continuing, by the mobile terminal, if the number N of times of omitting software interruption within a first preset duration is not greater than a preset threshold, displaying a second virtual animation image, and returning to perform the step of determining whether the application has been interrupted.

For example, if a mobile terminal determines that the value of N has not exceeded 7 within a week, the mobile terminal may continue displaying the second virtual animation image that has already been displayed previously, and continue determining whether the application has been interrupted.

In an example, after the determining, by the mobile terminal, according to a current display probability X, whether a first virtual animation image including option information on software interruption needs to be displayed, the method further includes:

Performing, by the mobile terminal, if it is determined that the first virtual animation image needs not to be displayed, the step of determining whether the application has been interrupted.

During implementation, after step 102 is performed, as whether to display a first virtual animation image is determined according to a current display probability X, the first virtual animation image may need not to be displayed. For example, if the value of X is defined as 0.6, the probability for the mobile terminal to display the first virtual animation image is 0.6, and the probability of displaying no prompt information and directly returning to continue the step of determining whether the application has been interrupted is 0.4.

In an example, after the displaying, by the mobile terminal, the first virtual animation image, the method further includes:

Performing, by the mobile terminal, the step of whether the application has been interrupted.

During implementation, after step 103 is performed, that is, after a first virtual animation image is displayed, if a user executes interruption, the mobile terminal interrupts the application; and if a user has not interrupted the application, it needs to continue performing the step of determining whether the application has been interrupted.

Figure 2:
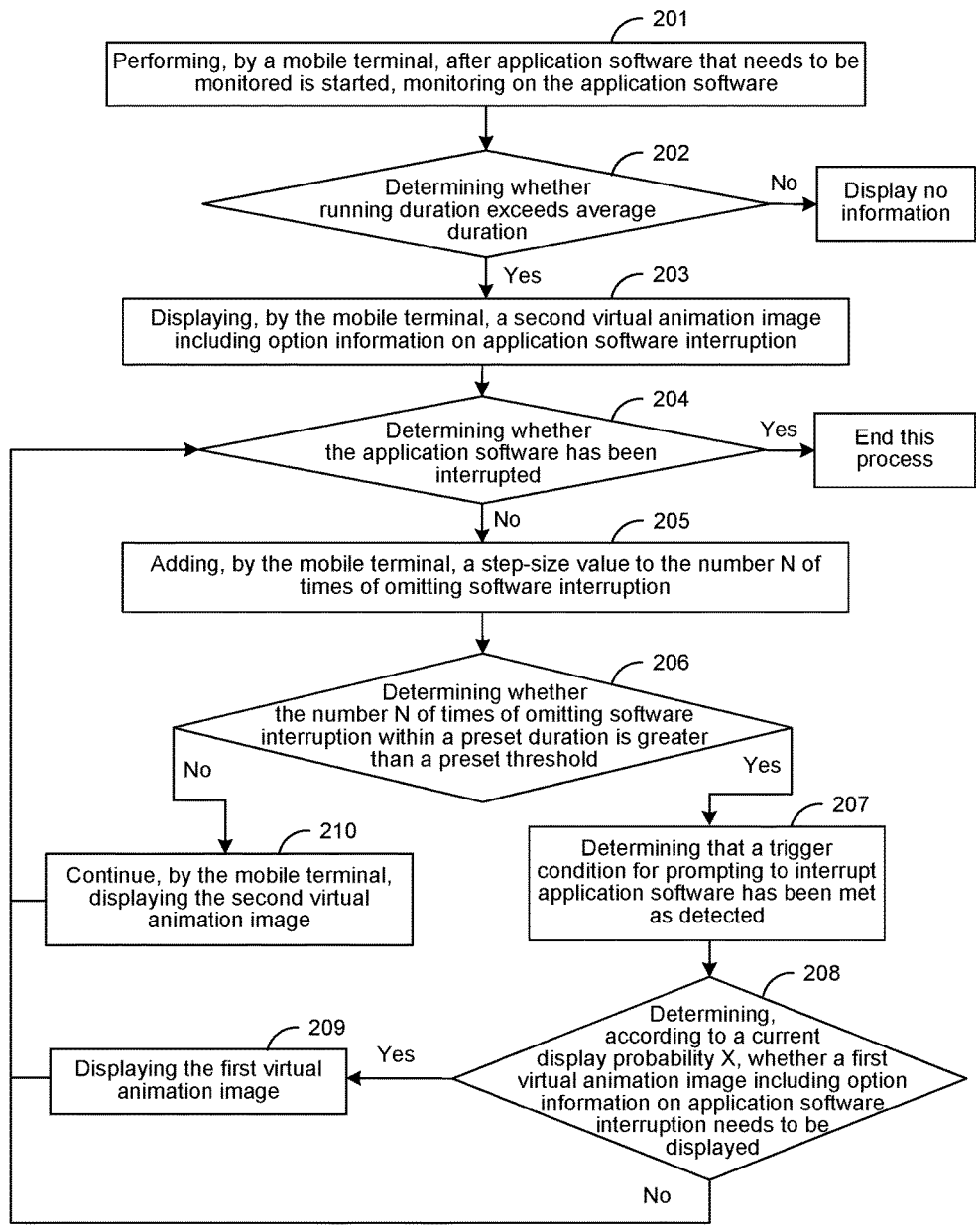
FIG. 2 is a general schematic flowchart of a first method for displaying a visual prompt according to an exemplary embodiment of the present disclosure.

From the above, the following describes in detail a general flowchart under the first circumstance, that is, the number of times of omitting software interruption within a preset duration is greater than a preset threshold. As shown in FIG. 2, provided is a general schematic flowchart of a first method for displaying a visual prompt according to an exemplary embodiment of the present disclosure.

Step 201: Monitoring an application by a mobile terminal after the application that needs to be monitored is started.

Step 202: Determining, by the mobile terminal, whether running duration exceeds average duration of daily running, and if yes, performing step 203; otherwise, displaying no information.

Step 203: Displaying, by the mobile terminal, a second virtual animation image including option information on the application interruption, and perform step 204.

Step 204: Determining, by the mobile terminal, whether the application has been interrupted, and if yes, end this process; otherwise, perform step 205.

Step 205: Adding, by the mobile terminal, a step-size value to the number N of times of omitting software interruption, and perform step 206.

Step 206: Determining, by the mobile terminal, whether the number N of times of omitting software interruption within a preset duration is greater than a preset threshold, and if yes, performing step 207; otherwise, performing step 210.

Step 207: Determining, by the mobile terminal, that a trigger condition for prompting to interrupt the application has been met as detected, and perform step 208.

Step 208: Determining, by the mobile terminal, according to a current display probability X, whether a first virtual animation image including option information on the application interruption needs to be displayed, and if yes, performing step 209; otherwise, performing step 204.

Step 209: Displaying, by the mobile terminal, the first virtual animation image, and perform step 204.

Step 210: Continuing, by the mobile terminal, displaying the second virtual animation image, and perform step 204.

In this exemplary embodiment of the present disclosure, the method further includes, in addition to the above circumstance when running duration of the application exceeds average running duration, a circumstance when running duration of the application does not exceed average running duration, but an abnormal event occurs. Under this circumstance, the mobile terminal may also prompt a user to interrupt running the application, which is specifically described as follows.

A second circumstance: a trigger condition includes that a mobile terminal detects occurrence of an abnormal event.

Specifically, the detecting, by the mobile terminal, that a trigger condition for prompting to interrupt the application has been met, includes:

Determining, if running duration of the application does not exceed average duration of daily running of the application, and an abnormal event is detected to occur, that a trigger condition for prompting to interrupt the application has been met.

During implementation, the second circumstance is a circumstance when running duration of the application does not exceed average running duration, but an abnormal event occurs. In this case, a mobile terminal may determine that the trigger condition has been met (that is, determine that a trigger condition for prompting to interrupt the application has been met as detected).

Occurrence of an abnormal event refers to that a mobile terminal determines running duration of the application that is running and needs to be monitored does not exceed average duration, and the mobile terminal itself is being located in an unconventional environment, or the application that needs to be monitored is started during a period of time that is not commonly used. In this case, the mobile terminal may directly determine that a trigger condition for prompting to interrupt the application has been met. For example, a mobile terminal detects that the application that needs to be monitored runs between 1 AM and 5 AM (local time); a mobile terminal detects an abnormal ambient temperature (such as an ambient temperature of lower than −10° or higher than 35°), or an excessively high ambient humidity (such as an ambient humidity of over 90%), or an event of rapid movement (such as at a rate of greater than 120 km/h) of a mobile terminal occurs, or the like. Therefore, when the above abnormal events occur, the mobile terminal directly determines that a trigger condition for prompting to interrupt the application has been met as detected; determines, according to a current display probability X, whether a first virtual animation image including option information on the application interruption needs to be displayed; and further displays, after it is determined that the first virtual animation image needs to be displayed, the first virtual animation image.

Under the second circumstance, after step 103 is performed by the mobile terminal, a user may also select interrupting the application or omitting prompt information, which is specifically described as follows.

In an example, after the displaying, by the mobile terminal, the first virtual animation image, the method further includes:

determining, by the mobile terminal, whether the application has been interrupted; adding, after it is determined that the application has not been interrupted, a step-size value to the number N of times of omitting software interruption; and determining, whether the number N of times of omitting software interruption within a first preset duration is greater than a preset threshold.

This step is the same as the step under the first circumstance, that is, a value of N may be set as demanded. Each time software interruption is omitted, or if an application interruption key has not been clicked for a long time, the value of N is increased by 1. The mobile terminal then continues determining whether the value of N exceeds 7 within a week.

In an example, if the number N of times of omitting software interruption within a first preset duration is greater than a preset threshold, it is determined that a trigger condition for prompting to interrupt the application has been met as detected.

The determining whether the application has been interrupted, includes:

Determining, if a user does not click an interruption key displayed by the mobile terminal within a second preset duration, or a user clicks an omission key displayed by the mobile terminal, that the application has not been interrupted.

This step is the same as the step under the first circumstance, that is, if a mobile terminal determines that the value of N has exceeded 7 within a week, the mobile terminal may determine, according to a current display probability X, whether a first virtual animation image including option information on the application interruption needs to be displayed.

In an example, after the determining, by the mobile terminal, according to a current display probability X, whether a first virtual animation image including option information on software interruption needs to be displayed, the method further includes:

Performing, by the mobile terminal, if it is determined that the first virtual animation image needs not to be displayed, the step of determining whether the application has been interrupted.

During implementation, similar to the first circumstance, after step 103 is performed, that is, after a first virtual animation image is displayed, if a user executes interruption, the mobile terminal interrupts the application; and if a user has not interrupted the application, it needs to continue performing the step of determining whether the application has been interrupted.

Figure 3:
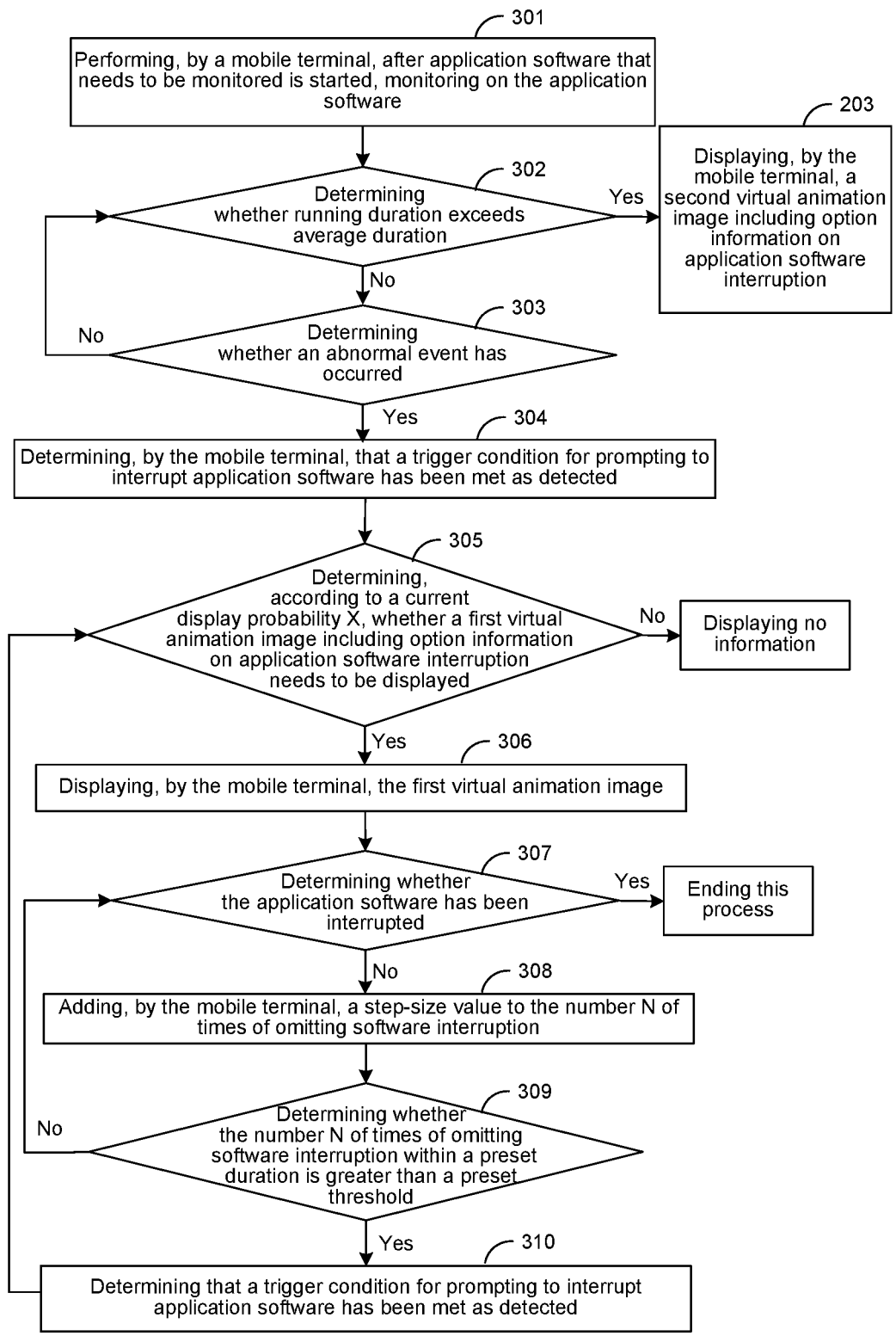
FIG. 3 is a general schematic flowchart of a second method for displaying a visual prompt according to an exemplary embodiment of the present disclosure.

From the above, the following describes in detail a general flowchart under the second circumstance, that is, a trigger condition includes that a mobile terminal detects occurrence of an abnormal event. As shown in FIG. 3, provided is a general schematic flowchart of a second method for displaying a visual prompt according to an exemplary embodiment of the present disclosure.

Step 301: Monitoring, by a mobile terminal, the application after the application that needs to be monitored is started.

Step 302: Determining, by the mobile terminal, whether running duration exceeds average duration, and if yes, displaying, by the mobile terminal, a second virtual animation image including option information on the application interruption, that is, performing step 203; otherwise, performing step 303.

Step 303: Determining, by the mobile terminal, whether an abnormal event has occurred, and if yes, performing step 304; otherwise, performing step 302.

Step 304: Determining, by the mobile terminal, that a trigger condition for prompting to interrupt the application has been met as detected, and performing step 305.

Step 305: Determining, by the mobile terminal, according to a current display probability X, whether a first virtual animation image including option information on the application interruption needs to be displayed, and if yes, performing step 306; otherwise, displaying, by the mobile terminal, no information.

Step 306: Displaying, by the mobile terminal, the first virtual animation image, and performing step 307.

Step 307: Determining, by the mobile terminal, whether the application has been interrupted, and if yes, performing step 308; otherwise, ending this process.

Step 308: Adding, by the mobile terminal, a step-size value to the number N of times of omitting software interruption, and perform step 309.

Step 309: Determining, by the mobile terminal, whether the number N of times of omitting software interruption within a preset duration is greater than a preset threshold, and if yes, performing step 310; otherwise, returning to step 307.

Step 310: Determining, by the mobile terminal, that a trigger condition for prompting to interrupt the application has been met as detected, and returning to step 305.

For a current probability X mentioned in the above two circumstances, a user may set the current probability in advance as demanded, which is specifically described as follows.

In an example, a current display probability X is determined in the following manner:

Displaying, by a mobile terminal, after receiving an instruction that a probability X needs to be set, preset parameters used for determining the probability X;

Determining, by the mobile terminal, after receiving a parameter selection instruction, parameters selected by a user; and Determining, by the mobile terminal, according to the preset parameters, a probability X that corresponds to the parameters selected by the user.

During implementation, a user may select setting the probability X. After receiving an instruction sent by a user that a probability X needs to be set, a mobile terminal displays parameters used for determining the probability X to the user; when the user selects some parameters therein, the mobile terminal may receive a parameter selection instruction sent by the user, and determine, according to the content of the instruction, specific parameters that are selected by the user; then determine, according to the preset parameters, a probability X that corresponds to the parameters selected by the user.

Several parameters used for determining a probability X may be preset in a mobile terminal, including multiple different parameters such as character, gender, age, education degree, occupation type, and monitoring degree. Meanwhile, a corresponding parameter value is preset for each parameter, for a user to calculate, after selecting parameters, a probability X by using the parameters.

In an example, the parameters used for determining a probability X include a character parameter value;

the parameters further include some or all of the following parameters: a gender parameter value, an age parameter value, an education degree parameter value, an occupation type parameter value, and a monitoring degree parameter value; and the determining, by the mobile terminal, according to the preset parameters, a probability X that corresponds to the parameters selected by the user, includes:

$$X=\text{character parameter value}*(\text{gender parameter value}+\text{age parameter value}+\text{education degree parameter value}+\text{occupation type parameter value}+\text{monitoring degree parameter value})/M,$$ (formula 1), where, M is the number of parameters used for determining a probability X except the character parameter value when a value of the probability X is determined.

During implementation, three character parameter values may be set as demanded, which respectively correspond to three types of different characters, that is, intellectual type, emotional type, and volitional type, and the parameter values representing the three types of characters are respectively set to 1, 1.1 and 1.2; parameter values representing different genders are respectively set to 1 for male, and 1.2 for female; five age parameter values may be set as demanded, which respectively correspond to five age levels, that is, below 20, 20 to 30, 30 to 45, 45 to 60, and above 60, and the parameter values representing the five age levels are respectively set to 0.3, 0.4, 0.5, 0.6 and 0.5; different education degrees may be divided into four levels as demanded, that is, below elementary school, middle school, bachelor, above master, and the parameter values representing the different culture degrees are respectively set to 0.3, 0.4, 0.5, and 0.6; different occupation types may be divided into four types, that is, students, office workers, private owners, and freelancers, and parameter values representing the different occupation types are respectively set to 0.3, 0.4, 0.5, and 0.6; monitoring degree is determined according to the quantity of monitored the application in a mobile terminal, and the monitoring degree may be divided into 3 levels according to the quantity of monitored the application, that is, monitoring 1% to 30% of the application in a mobile terminal corresponds to a monitoring level 1, monitoring 30% to 60% of the application in a mobile terminal corresponds to a monitoring level 2, and monitoring above 60% of the application in a mobile terminal corresponds to a monitoring level 3, and parameter values representing the different monitoring degrees are respectively set to 0.5, 0.8 and 1.

For example, parameter values corresponding to parameters selected by a user are respectively: a character parameter value 1, a gender parameter value 1.2, an age parameter value 0.4, an education degree parameter value 0.5, an occupation type parameter value 0.4, and a monitoring degree parameter value 0.8. The probability X is obtained through calculation according to formula 1:

$$X=1*(1.2+0.4+0.5+0.4+0.8)/5=0.58$$

That is, a probability X set by a user is equal to 0.58, and then a mobile terminal uses 0.58 as a current display probability.

During implementation, if a user has not set a probability X, or omits selecting some parameter values during a setting process, the probability X may be calculated according to a preset rule. For example, it may be set as demanded that a mobile terminal performs default calculation for a probability X in some specific cases. If a user has not set a probability X, a preset probability is used as a current display probability as default (such as X=0.5 as default); or the maximum or minimum value in all parameter values is used as a default value. If a user only selects some of parameter values during a process of selecting and setting X, a default value is 1 when an unselected parameter value is the character parameter value; and a default value is 0 when an unselected parameter value is a parameter value other than the character parameter value.

The parameters used for determining a probability X include but are not limited to the above types, and a calculation formula may also be set as demanded. Selection of a parameter value corresponding to each parameter is merely for the convenience of illustration, and the parameter value may be set as demanded during implementation.

Based on the same inventive conception, an exemplary embodiment of the present disclosure further provides a mobile terminal for displaying a visual prompt. Because a method corresponding to the mobile terminal for displaying a visual prompt shown in FIG. 4 is a method for displaying a visual prompt in the exemplary embodiments of the present disclosure, for implementation of the mobile terminal in this exemplary embodiment of the present disclosure, refer to implementation of the method, and the repetitive content is not described herein again.

As shown in FIG. 4, this exemplary embodiment of the present disclosure provides a mobile terminal for displaying a visual prompt. The mobile terminal includes: a monitoring module 401, a determining module 402, and a display module 403.

The monitoring module 401 is configured to perform, after it is detected that the application with a monitoring identifier has been started, monitoring on the application.

The determining module 402 is configured to determine, after it is detected that running of the application has met an interruption trigger condition, and according to a current display probability X, whether a first virtual animation image including option information on the application interruption needs to be displayed.

The display module 403 is configured to display, after it is determined that the first virtual animation image needs to be displayed, the first virtual animation image.

In an example, the display module 403 is further configured to:

display, if running duration of the application exceeds average duration of daily running of the application, a second virtual animation image including option information on the application interruption; and the determining module 402 is further configured to:

determine whether the application has been interrupted; add, after it is determined that the application has not been interrupted, a step-size value to the number N of times of omitting software interruption; and determine whether the number N of times of omitting software interruption within a first preset duration is greater than a preset threshold; and determine, if a user does not click a displayed interruption key within a second preset duration, or a user clicks a displayed omission key, that the application has not been interrupted.

In an example, the determining module 402 is specifically configured to:

determine, if the number N of times of omitting software interruption within a first preset duration is greater than a preset threshold, that a trigger condition for prompting to interrupt the application has been met.

In an example, the determining module 402 is further configured to:

continue, after it is determined whether the number N of times of omitting software interruption within a first preset duration is greater than a preset threshold, and if the number N of times of omitting software omission within the first preset duration is not greater than the preset threshold, triggering display of a second virtual animation image by the display module 403, and return to perform the step of determining whether the application has been interrupted.

In an example, the determining module 402 is specifically configured to:

determine, if running duration of the application does not exceed average duration of daily running of the application, and an abnormal event is detected to occur, that a trigger condition for prompting to interrupt the application has been met.

In an example, the determining module 402 is further configured to:

determine, after a first virtual animation image is displayed by the display module 403, whether the application has been interrupted; add, after it is determined that the application has not been interrupted, a step-size value to the number N of times of omitting software interruption; and determine, whether the number N of times of omitting software interruption within a first preset duration is greater than a preset threshold; determine, if the number N of times of omitting software interruption within the first preset duration is greater than the preset threshold, that a trigger condition for prompting to interrupt the application has been met as detected; and determine, if a user does not click a displayed interruption key within a second preset duration, or a user clicks a displayed omission key, that the application has not been interrupted.

In an example, the determining module 402 is further configured to:

perform, after it is determined according to a current display probability X whether a first virtual animation image including option information on software interruption needs to be displayed, and if it is determined that the display module 403 needs not to display the first virtual animation image, the step of determining whether the application has been interrupted.

In an example, the determining module 402 determines a current display probability X in the following manner:

displaying, after an instruction that a probability X needs to be set is received, preset parameters used for determining the probability X;

determining, after a parameter selection instruction is received, parameters selected by a user; and determining, according to the preset parameters, a probability X that corresponds to the parameters selected by the user.

In an example, the parameters used for determining a probability X include a character parameter value;

the parameters further include some or all of the following parameters: a gender parameter value, an age parameter value, an education degree parameter value, an occupation type parameter value, and a monitoring degree parameter value; and the determining, by the determining module 402, according to the preset parameters, a probability X that corresponds to the parameters selected by the user, includes:

X=character parameter value*(gender parameter value+age parameter value+education degree parameter value+occupation type parameter value+monitoring degree parameter value)/M, where, M is the number of parameters used for determining a probability X except the character parameter value when a value of the probability X is determined.

It can be seen from the above content that, in this exemplary embodiment of the present disclosure, as a mobile terminal not only has an additional function of performing, when the application that needs to be monitored is run, real-time monitoring on the running the application, but also can prompt, when it is detected according to monitoring conditions that a preset trigger condition has been met, a user by using a virtual animation image with a certain probability X to interrupt the running the application, thereby increasing functions of a mobile terminal.

A person skilled in the art should understand that, the exemplary embodiments of the present disclosure may be provided as a method, a system, or a computer program product. Therefore, the present disclosure may use a form of a hardware exemplary embodiment, a software exemplary embodiment, or an exemplary embodiment combining hardware and software. Moreover, the present disclosure may use a form of computer program product implemented on one or more computer available storage media (including but not limited to a disk memory, a CD-ROM, an optical memory, and the like) including computer available program code.

The present disclosure is described with reference to flowcharts and/or block diagrams according to the method, the device (system), and the computer program product in the exemplary embodiments of the present disclosure. It should be understood that, each process and/or block in the flowcharts and/or block diagrams, and a combination of processes and/or blocks in the flowcharts and/or block diagrams may be implemented by computer program instructions. These computer program instructions may be provided to a general-purpose computer, a dedicated computer, an embedded processor, or a processor of another programmable data processing device, to generate a machine, so that an apparatus configured to implement functions specified in one or more processes in the flowcharts and/or one or more blocks in the block diagrams is generated by using instructions executed by the computer or the processor of another programmable data processing device.

These computer program instructions may also be stored in a computer-readable memory that can guide a computer or another programmable data processing device to work in a specific manner, so that the instructions stored in the computer readable memory generate a product including an instruction apparatus, where the instruction apparatus implements functions specified in one or more processes in the flowcharts and/or one or more blocks in the block diagrams.

These computer program instructions may also be loaded into a computer or another programmable data processing device, so that a series of operational steps are performed on the computer or another programmable device to generate processing implemented by a computer, and instructions executed on the computer or another programmable device provide steps for implementing functions specified in one or more processes in the flowcharts and/or one or more blocks in the block diagrams.

Although preferred exemplary embodiments of the present disclosure have been described, a person skilled in the art may make other changes and modifications to these exemplary embodiments once getting aware of basic creative concepts. Therefore, the appended claims are intended to include the preferred exemplary embodiments and all changes and modifications thereof that fall within the scope of the present disclosure.

Apparently, a person skilled in the art may make various changes and transformations to the present disclosure without departing from the spirit and scope of the present disclosure. Thus, if these changes and transformations of the present disclosure fall within the scope of the claims of the present disclosure and the scope of equivalent technologies, the present disclosure is also intended to include these changes and transformations.

The invention claimed is:

1. A mobile terminal, comprising:
 a processor-readable storage medium including a set of instructions for displaying a visual prompt; and
 a processor in communication with the storage medium, wherein when executing the set of instructions, the processor is directed to:
  monitor an application after detecting that the application has been started in the mobile terminal; and
  when detecting that running of the application has met a trigger condition for prompting a user of the application to consider interrupting the running of the application:
   determine a prompting probability X; and
   iteratively display a first full-screen virtual animation image as the visual prompt while the application is running with a display probability determined by the prompting probability X until the user has selected a first selectable option contained in the visual prompt to interrupt the running of the application, wherein the visual prompt additional comprises a second selectable option to omit interruption of the running of the application.

2. The mobile terminal according to claim 1, wherein before detecting that the running of the application has met the trigger condition, the processor is further directed to:
 display a second virtual animation image to provide a second selectable option to interrupt the running of the application to the user of the application when a monitored running duration of the application exceeds an average continuous running duration of the application within a predetermined time duration unit.

3. The mobile terminal according to claim 2, wherein the trigger condition for prompting the user to interrupt the running of the application is met when the user fails to select the first selectable option to interrupt the running of the application for more than a preset threshold number of times during a first preset duration.

4. The mobile terminal according to claim 3, wherein the user fails to select the first selectable option to interrupt the running of the application when the user does not click an interruption key displayed by the mobile terminal with the visual prompt within a second preset duration, or when the user selects the second selectable option to omit interruption of the running of the application.

5. The mobile terminal according to claim 1, wherein the trigger condition for prompting the user to interrupt the running of the application is met when a monitored running duration of the application does not exceed an average continuous running duration of the application within a predetermined time duration unit but a predetermined abnormal event is detected.

6. The mobile terminal according to claim 1, wherein the processor is further directed to:

display a plurality of preset parameters associated with the prompting probability X;
receive at least one selection from a user among the plurality of preset parameters; and
determine the prompting probability X according to the at least one selection by the user.

7. The mobile terminal according to claim 6, wherein to determine the prompting probability X, the processor is further directed to:
calculate a sum of the at least one of a gender parameter value, an age parameter value, an education degree parameter value, an occupation type parameter value, and a monitoring degree parameter value; and
calculate the prompting probability X according to:

$X=$character parameter value$*$sum$/M$, wherein, M is a number of parameters being summed and the character parameter value represents a general type of the user.

8. A method for displaying a visual prompt, comprising:
monitoring, by a mobile terminal, an application after detecting that the application has been started in the mobile terminal; and
when detecting that running of the application has met a trigger condition for prompting a user of the application to consider interrupting the running of the application:
determining, by the mobile terminal, a prompting probability X; and
iteratively display a first full screen virtual animation image with a display probability determined by the prompting probability X until the user has selected a first selectable option contained in the visual prompt to interrupt the running of the application, wherein the visual prompt additional comprises a second selectable option to omit interruption of the running of the application.

9. The method according to claim 8, wherein before detecting that the running of the application has met the trigger condition, the method further comprises:
displaying, by the mobile terminal, a second virtual animation image to provide a second selectable option to interrupt the running of the application to the user of the application when a monitored running duration of the application exceeds an average continuous running duration of the application within a predetermined time duration unit.

10. The method according to claim 9, wherein the trigger condition for prompting the user to interrupt the running of the application is met when the user fails to select the first selectable option to interrupt the running of the application for more than a preset threshold number of times during a first preset duration.

11. The method according to claim 10, wherein the user fails to select the first selectable option to interrupt the running of the application when the user does not click an interruption key displayed by the mobile terminal with the visual prompt within a second preset duration, or when the user selects the second selectable option to omit interruption of the running of the application.

12. The method according to claim 8, wherein the trigger condition for prompting the user to interrupt the running of the application is met when a monitored running duration of the application does not exceed a an average continuous running duration of the application within a predetermined time duration unit but a predetermined abnormal event is detected.

13. The method according to any one of claim 8, further comprising:
displaying, by the mobile terminal, a plurality of preset parameters associated with the prompting probability X;
receiving, by the mobile terminal, at least one selection from a user among the plurality of preset parameters; and
determining, by the mobile terminal, the prompting probability X according to the at least one selection by the user.

14. The method according to claim 13, wherein the determining of the prompting probability X comprises:
calculating a sum of the at least one of a gender parameter value, an age parameter value, an education degree parameter value, an occupation type parameter value, and a monitoring degree parameter value; and
calculating the prompting probability X according to:

$X=$character parameter value$*$sum$/M$, wherein, M is a number of parameters being summed and the character parameter value represents a general type of the user.

15. A non-transitory processor-readable storage medium, comprising a set of instructions for displaying a visual prompt on a mobile terminal, wherein when a processor of a mobile terminal executes the set of instructions, the set of instructions directs the processor to perform acts of:
monitoring an application after detecting that the application has been actively running in the mobile terminal; and
when detecting that running of the application has met a trigger condition for prompting a user of the application to consider interrupting the running of the application:
determining a prompting probability X; and
iteratively displaying a first full-screen virtual animation image as the visual prompt with a display probability determined by the prompting probability X until the user has selected a first selectable option contained in the visual prompt to interrupt the running of the application, wherein the visual prompt additional comprises a second selectable option to omit interruption of the running of the application.

16. The storage medium according to claim 15, wherein before detecting that the running of the application has met the trigger condition, the set of instructions further directs the processor to perform acts of:
displaying, by the mobile terminal, a second virtual animation image to provide a second selectable option to interrupt the running of the application to the user of the application when a monitored running duration of the application exceeds an average continuous running duration of the application within a predetermined time duration unit.

17. The storage medium according to claim 16, wherein the trigger condition for prompting the user to interrupt the running of the application is met when the user fails to select the first selectable option to interrupt the running of the application for more than a preset threshold number of times during a first preset duration.

18. The storage medium according to claim 17, wherein the user fails to select the first selectable option to interrupt the running of the application when the user does not click an interruption key displayed by the mobile terminal with the visual prompt within a second preset duration, or when the user selects the second selectable option to omit interruption of the running of the application.

19. The storage medium according to claim 15, wherein the trigger condition for prompting the user to interrupt the running of the application is met when a monitored running duration of the application does not exceed an average continuous running duration of the application within a predetermined time duration unit but a predetermined abnormal event is detected.

20. The storage medium according to claim 15, wherein the set of instructions further directs the processor to perform acts of:
- calculating a sum of the at least one of a gender parameter value, an age parameter value, an education degree parameter value, an occupation type parameter value, and a monitoring degree parameter value; and
- calculating the prompting probability X according to:

$$X = \text{character parameter value} * \text{sum}/M,$$

wherein, M is a number of parameters being summed and the character parameter value represents a general type of the user.

* * * * *